United States Patent [19]

Otsuka et al.

[11] 4,130,668

[45] Dec. 19, 1978

[54] METHOD FOR CHEMICALLY PEELING FRUITS AND VEGETABLES

[75] Inventors: Shigeru Otsuka, Toyonaka; Zenichi Mōri, Wakayama; Tetsuhiko Tominaga, Takarazuka; Junichi Tamura, Wakayama; Yoshio Shimoda, Ikeda; Takashi Takeuchi, Wakayama; Masakazu Oku, Hyogo; Kan Mori, Wakayama, all of Japan

[73] Assignees: Kao Soap Co., Ltd.; Toyo Seikan Kaisha, Ltd., both of Tokyo, Japan

[21] Appl. No.: 822,705

[22] Filed: Aug. 8, 1977

Related U.S. Application Data

[63] Continuation of Ser. No. 679,018, Apr. 21, 1976, abandoned.

[30] Foreign Application Priority Data

Apr. 30, 1975 [JP] Japan .................................. 50-52192

[51] Int. Cl.$^2$ ............................................. A23L 1/212
[52] U.S. Cl. .................................. 426/287; 426/482; 426/615
[58] Field of Search ............... 426/287, 482, 442, 483, 426/615, 616, 637, 288; 252/156, 352, DIG. 1, DIG. 14

[56] References Cited

U.S. PATENT DOCUMENTS

| 2,495,066 | 6/1950 | Jones | 252/DIG. 1 |
| 2,582,868 | 1/1952 | Hausmann et al. | 252/DIG. 1 |
| 3,102,114 | 8/1963 | Komori et al. | 252/DIG. 1 |
| 3,920,856 | 11/1975 | Aepli et al. | 426/287 |
| 3,926,831 | 12/1975 | Sonnengruber | 252/DIG. 1 |
| 3,948,819 | 4/1976 | Wilde | 252/156 X |

FOREIGN PATENT DOCUMENTS

26294 7/1972 Japan ..................................... 426/287

OTHER PUBLICATIONS

Translation of Japanese Patent 26,294.

*Primary Examiner*—Arthur L. Corbin
*Attorney, Agent, or Firm*—Blanchard, Flynn, Thiel, Boutell & Tanis

[57] ABSTRACT

Fruits or vegetables are peeled by immersing a fruit or vegetable in an aqueous solution of an alkali to which is added (a) at least one member selected from polyoxyethylene sorbitan fatty acid esters and sucrose fatty acid esters having an HLB value higher than 9 and (b) at least one member selected from glycerin fatty acid esters, sorbitan fatty acid esters, propylene glycol fatty acid esters and sucrose fatty acid esters having an HLB not higher than 9.

9 Claims, No Drawings

METHOD FOR CHEMICALLY PEELING FRUITS AND VEGETABLES

This is a continuation of application Ser. No. 679,018, filed Apr. 21, 1976, now abandoned.

BACKGROUND OF INVENTION

1. Field of Invention

The present invention relates to a method of chemically peeling fruits or vegetables.

Fruits or vegetables not only are served as raw foods but also are processed into preserved foods such canned foods, bottled foods and frozen foods. In preparing these processed foods, a peeling treatment is often indispensable.

2. Description of Prior Arts

As the conventional peeling method adopted in the processed food-making industry, there can be mentioned, for example, (1) a so-called hot water-peeling method in which fruit skins are damaged and removed by hot water or steam, (2) a hot alkali peeling method in which fruits or vegetables are immersed in a hot alkali solution, (3) a hot acid peeling method in which fruits or vegetables are immersed in a hot acid solution, (4) a method using an acid and an alkali in combination, (5) an enzymatic peeling method using an enzyme and (6) a mechanical peeling method. Among these methods, the method (1) is suitable for peeling white peaches, and the method (2) is used for peeling yellow peaches, apples and the like. The methods (4) and (6) are used for peeling oranges and apples, respectively. The methods (3) and (5) are not practically used.

The method (1) is troublesome because the degree of ripeness of fruit should be uniform and hence, this method is not suitable for mass production. The methods (2) and (3) are advantageous in that the treatment can be completed in a shorter time than in the method (1) and mass production is possible according to these methods. These methods (2) and (3), however, are defective in that because of the strong action of the treatment chemical used, skin roughness, breakage of flesh and reduction of the yield due to excessive peeling and discoloration of flesh are often caused. In the method (4) the degree of damage of flesh is lower than in the methods (2) and (3), but since hydrochloric acid is used, corrosion of the treatment equipment cannot be avoided. Further, hydrochloric acid should be neutralized in the treatment of the waste water and a large amount of a neutralizing agent should be used. Still further, since the waste water possesses inferior properties of agglomeration or precipitation when a treating chemical is added, a high BOD load is imposed on the biochemical treatment, and the waste water treatment becomes expensive. The method (5) involves practical problems because the treatment should be conducted for a long time, and in some cases, not only the skin but also the flesh portion is treated causing skin roughness and breakage of flesh. The method (6) is poor in practical utility and very expensive, and the loss is very large in this method.

In addition, certain kinds of surface active agents are used for peeling fruits and vegetables. More specifically, there have been attempted a method in which sodium alkyl benzenesulfonate is added to an aqueous solution of an alkali having a high concentration (for example, 10% or higher) and a method in which polyoxyethylene alkyl ether or polyoxyethylene alkyl aryl ether is used for the above-mentioned treatment using an acid and an alkali in combination. Also in these methods, there are similarly observed such defects as degradation of the quality, reduction of the operation efficiency and decrease of the yield, and the problems involved in the conventional peeling methods are not solved by the use of surface active agents.

SUMMARY OF INVENTION

It is therefore a primary object of the present invention to provide a peeling method over comes the foregoing defects of the conventional methods, in which the yield, quality and operation efficiency can be improved and the processing and waste water disposal can be economically performed.

As a result of our research works made with a view to attaining this object on methods of peeling fruits and vegetables by surface active agents, it was found that when a specific combination of non-ionic surface active agents, specially selected from a great number of surface active agents, is added to an aqueous solution of an alkali and fruits or vegetables are immersed in this solution, the peeling treatment can be accomplished very effectively and the object of the present invention can be attained.

More specifically, in accordance with the present invention, there is provided a method of the peeling treatment of fruits or vegetables, characterized in that the peeling treatment is performed by immersing a fruit or vegetable in an aqueous solution of an alkali to which are added (a) at least one member selected from polyoxyethylene sorbitan fatty acid esters and sucrose fatty acid esters having an HLB value higher than 9 and (b) at least one member selected from glycerin fatty acid esters, sorbitan fatty acid esters, propylene glycol fatty acid esters and sucrose fatty acid esters having an HLB not higher than 9.

According to the present invention, a high peeling effect can be attained at a very low alkali concentration (for example, 1% or lower) at which no substantial effect can be attained by the use of sodium alkyl benzenesulfonate known as an additive for the alkali peeling treatment or by the use of polyoxyethylene alkyl ether or polyoxyethylene alkyl aryl ether used in the conventional peeling method using an acid and an alkali in combination. For example, in the process of peeling orange segments, about 90 minutes are required in the conventional two-stage method comprising the acid treatment and the alkali treatment, whereas in the low-alkali one-stage method of the present invention, a treatment time of 30 minutes is sufficient and the treatment time can be remarkably shortened. This is one of advantages of the present invention.

According to this invention, the peeling treatment is generally effected at a temperature in the range between a room temperature and 90° C., preferably 30° and 85° C., for a period of time in the range between 1 and 30 minutes, preferably 3 and 20 minutes.

As the polyoxyethylene sorbitan fatty acid ester to be used as the non-ionic surface active agent component (a) in the present invention, compounds obtained by adding 3 to 60 moles of ethylene oxide to a sorbitan fatty acid ester derived from a fatty acid having 8 to 18 carbon atoms are preferably employed.

As the sucrose fatty acid ester having an HLB value higher than 9 that is used in the present invention, sucrose fatty acid monoesters and diesters are preferably employed. The fatty acid portion of the ester has 8 to 18 carbon atoms, preferably 12 to 18 carbon atoms. A mixture of sucrose fatty acid monoester, diester and triester can be used as far as the HLB value of the mixture is higher than 9.

Each of the non-ionic surface active agents (b) used in the present invention, namely glycerin fatty acid esters, sorbitan fatty acid esters, propylene glycol fatty acid esters and sucrose fatty acid esters having an HLB value not higher than 9, preferably has 8 to 18 carbon atoms in the fatty acid portion. These esters of polyhydroxyl compounds may be monoesters, diesters and mixtures of monoesters, diesters and triesters. For example, in the case of a sucrose fatty acid ester having a lauryl group as the alkyl group, a mixture of 35% of the monoester and 65% of the diester and triester (an HLB value of 9.0) may be used, and in the case of a sucrose fatty acid having an oleyl group as the alkyl group, a mixture of 40% of the monoester and 60% of the diester and triester (an HLB value of 9.0) may be used. In the case of a sorbitan fatty acid ester having a lauryl group as the alkyl group, a mixture of 30% of the monoester and 70% of the diester and triester (an HLB value of 8.5) may be employed. In the case of a propylene glycol fatty acid ester having a stearyl group as the alkyl group, a mixture of 70% of the monoester and 30% of the diester (an HLB value of 3.4) may be used, and in the case of a glycerin fatty acid ester having an oleyl group as the alkyl group, a mixture of 65% of the monoester and 35% of the diester and triester (an HLB value of 3.7) may be used.

As is well-known in the art, "HLB" is an abbreviation of "hydrophilic-lipophilic balance". The HLB values are used for selection of surface active agents and anticipating their effects. Surface active agents are amphoteric compounds having both hydrophilic and lipophilic groups in the structure thereof and by virtue of this specific structure, they show a surface active characteristic.

The method proposed by Griffin [J. Soc. Cosmetic Chemists, 5, 249 (1954)] is now generally used for calculation of HLB values. More specifically, in the case of polyoxyethylene sorbitan fatty acid esters, sucrose fatty acid esters and the like, HLB values are calculated according to the following formula:

$$HLB = 20 (1 - S/A)$$

wherein S denotes the saponification value of the fatty acid ester and A denotes the neutralization value of the fatty acid. When the HLB value is low, the lipophilic property is enhanced, and when the HLB value is high, the hydrophilic property is enhanced. In the art it is known that the relation shown in the following table is established between the HLB value of the surface active agent and the water solubility thereof.

Table

| HLB Value | Water Solubility |
|---|---|
| 1 – 4 | not dispersed |
| 3 – 6 | not well dispersed |
| 6 – 8 | milky dispersion |
| 8 – 13 | semi-transparent or transparent dispersion |
| above 13 | transparent solution |

In the present invention, a composition comprising 1 to 5 parts by weight of the non-ionic surface active agent (a) and 5 to 1 parts by weight of the non-ionic surface active agent (b) is added to an aqueous solution of an alkali.

The amount of the non-ionic surface active agent composition is 0.005 to 1.0% by weight based on the aqueous solution of the alkali. Even if the composition is used in a larger amount, the peeling effect is not substantially improved, but bubbling is enhanced which has a bad influence on the operation efficiency, and economic disadvantages occur.

As the alkali, sodium hydroxide is generally employed.

As the fruit to be treated according to the present invention, there can be mentioned, for example, orange, peach, apple, apricot, loquat, grapes, pear, fig and persimmon, and as the vegetable, there can be mentioned, for example, tomato, potato, sweet potato, cucmber and radish.

In the conventional alkali peeling method using an aqueous solution of an alkali alone, when peach or apricot is peeled, an aqueous solution of sodium hydroxide having such a high concentration as 5 to 20% is employed. In contrast, in the present invention, the concentration is in the range between 0.1 and 1.5 wt.%, preferably 0.2 and 1.0 wt.%, more preferably 0.2 to 0.5 wt.%, and sufficient results are obtained at such a low alkali concentration.

According to the present invention, there can be obtained processed foods of good quality which foods possess excellent solidness of the flesh, flavor and luster. Further, in the present invention, the ratio of breakage is low and hence, the yield is high. Still further, the rate of the browning of flesh is lowered and peeling can be accomplished smoothly in a short time at a relatively low temperature. An regards the treatment of waste water after the peeling treatment, agglomeration and precipitation can be performed by calcium hydroxide more easily than in the conventional acid-alkali peeling treatment method. Therefore, the defect of the conventional method that the waste water treatment is not performed smoothly by the activated sludge method because of too high B. O. D. (biological oxygen demand) values can be effectively overcome in the present invention.

The present invention will now be described in detail by reference to the following Examples that are given to show the characteristics and effects of the method of the present invention and that by no means limit the scope of the present invention. In these Examples, all references to "%" are by weight.

EXAMPLE 1

Peeling of Orange Segment

Oranges of the Unshu variety were immersed in hot water for 2 minutes, and the outside skin was removed. The peeled fruits were segmented from one another and 300 g of segments were collected and placed in 600 g of a peeling liquid shown in Table 1. The treatment was conducted at a prescribed temperature for a prescribed period in a thermostat water tank of the shaking type.

After the treatment, the treated flesh was washed in running water and taken out. The peeling state of the inside skin, the luster of flesh, the flavor and the solidness were examined.

The peeling ratio was expressed in terms of the ratio of the completely peeled segments to the total segments. The break ratio was expressed in terms of the ratio of the broken fruit bags to the total fruit bags.

For comparison, peeling was conducted according to the conventional method (the method in which the alkali treatment was carried out after the acid treatment). More specifically, the treatment was first conducted by using a 0.8 aqueous solution of hydrochloric acid and then by using a 0.5% aqueous solution of sodium hydroxide.

Results of these tests are shown in Tables 1 and 2.

Table 3-continued

| Sample No. | Texture Value |
| --- | --- |
| 9 (comparative sample) | 0.897 |

Table 1

| Sample No. | Peeling Liquid | Treatment Time (min.) | Treatment Temperature (° C) | Peeling Ratio (%) | Break Ratio (%) |
| --- | --- | --- | --- | --- | --- |
| Samples of the Present Invention | | | | | |
| 1 | water containing 5% of sodium hydroxide, 0.1% of sucrose monooleate (HLB of 13) and 0.05% of sorbitan monolaurate | 20 | 30 | 100 | 0 |
| 2 | water containing 0.2% of sodium hydroxide, 0.1% of polyoxyethylene (15) sorbitan palmitate and 0.02% of glycerin monooleate | 20 | 30 | 100 | 0 |
| 3 | water containing 0.2% of sodium hydroxide, 0.1% of sucrose monolaurate (HLB of 15) and 0.03% of sucrose distearate (HLB of 7) | 20 | 30 | 100 | 0 |
| 4 | water containing 0.2% of sodium hydroxide, 0.1% of polyoxyethylene (15) sorbitan palmitate and 0.03% of propylene glycol monolaurate | 20 | 30 | 100 | 0 |
| Comparative Samples | | | | | |
| 5 | 1% aqueous solution of sodium hydroxide | 30 | 40 | 56 | 7 |
| 6 | 1% aqueous solution of hydrochloric acid | 60 | 40 | 1 | — |
| 7 | 0.8% hydrochloric acid → 0.5% sodium hydroxide (conventional method) | 40 → 20 | 35 → 30 | 78 | 19 |
| 8 | 0.2% aqueous solution of hydroxide | 20 | 30 | 17 | — |
| 9 | water containing 0.2% of sodium hydroxide and 0.2% of sodium dodecyl benzenesulfonate | 20 | 30 | 29 | — |
| 10 | water containing 0.2% of sodium hydroxide and 0.2% of polyoxyethylene (10) lauryl ether | 20 | 30 | 18 | — |
| 11 | water containing 0.2% of sodium hydroxide and 0.2% of polyoxyethylene (40) sorbitan laurate | 20 | 30 | 42 | — |

Table 2

| Sample No. | Peeling Liquid | Treatment Time (min.) | Treatment Temperature (° C) | Luster | Flavor | Solidness |
| --- | --- | --- | --- | --- | --- | --- |
| Samples of the Present Invention | | | | | | |
| 1 | water containing 0.2% of sodium hydroxide, 0.1% of sucrose monooleate (HLB of 13) and 0.05% of soribtan monolaurate | 20 | 30 | good | good | good |
| 2 | water containing 0.2% of sodium hydroxide, 0.1% of polyoxyethylene (15) sorbitan pamitate and 0.02% of glycerin monooleate | 20 | 30 | good | good | good |
| Comparaive Samples | | | | | | |
| 5 | 1% aqueous solution of sodium hydroxide | 30 | 40 | ordinary | ordinary | ordinary |
| 6 | 0.8% hydrochloric acid → 0.5% sodium hydroxide | 40 → 20 | 35 → 30 | ordinary | ordinary | ordinary |
| 10 | water containing 0.2% of sodium hydroxide and 0.2% of polyoxyethylene (10) lauryl ether | 20 | 30 | ordinary | ordinary | ordinary |

Textures of fleshes of oranges peeled by using peeling liquid samples 3, 5, 7 and 9 shown in Table 1 were determined by a texturometer (manufactured by Zenken Kabushiki Kaisha) to obtain the results shown in Table 3. Each value is a mean value obtained with respect to 20 segments. A higher value indicates a higher hardness (tigher texture).

Table 3

| Sample No. | Texture Value |
| --- | --- |
| 3 (sample of the present invention) | 0.916 |
| 5 (comparative sample) | 0.881 |
| 7 (comparative sample) | 0.856 |

EXAMPLE 2

Peeling of Peach

White peach was immersed in hot water for 30 seconds and cut into 4 pieces. Then, these cut pieces were immersed in a peeling liquid maintained at a prescribed temperature for a prescribed period of time. Then, the treated pieces were immersed in a 0.05N aqueous solution of citric acid and washed with water. The peeling ratio was determined to obtain results shown in Table 4. The peeling ratio is expressed in terms of the ratio of the completely peeled peach pieces to the total peach pieces tested.

Table 4

| Sample No. | Peeling Liquid | Treatment Time (min.) | Treatment Temperature (°C) | Peeling Ratio (%) |
|---|---|---|---|---|
| Samples of the Present Invention | | | | |
| 12 | water containing 0.5% of sodium hydroxide, 0.1% of sucrose monooleate (HLB of 13) and 0.1% of sorbitan monolaurate | 3 | 75 | 98 |
| 13 | water containing 0.5% of sodium hydroxide, 0.1% of polyoxyethylene (15) sorbitan oleate and 0.1% of sucrose distearate (HLB of 7) | 3 | 75 | 94 |
| Comparative Samples | | | | |
| 14 | 5% aqueous solution of sodium hydroxide | 3 | 85 | 66 |
| 15 | water containing 5% of sodium hydroxide and 0.2% sodium dodecyl benzenesulfonate | 3 | 85 | 89 |
| 16 | 0.5% aqueous solution of sodium hydroxide | 5 | 75 | 4 |
| 17 | water containing 0.5% of sodium hydroxide and 0.2% of sucrose distearate (HLB of 7) | 3 | 75 | 32 |

The browning rate, hardness and flavor of white peaches treated by peeling liquid samples 12, 15, 16 and 17 were examined to obtain results shown in Table 5.

Table 5

| Sample No. | Treatment Time (min.) | Treatment Temperature (°C) | Browning Rate | Yield (%) | Hardness | Flavor |
|---|---|---|---|---|---|---|
| Sample of the Present Invention | | | | | | |
| 12 | 3 | 75 | low | 92 | good | good |
| Comparative Samples | | | | | | |
| 15 | 3 | 85 | very high | 76 | ordinary | ordinary |
| 16 | 5 | 75 | high | 86 | good | ordinary |
| 17 | 3 | 75 | slightly low | 90 | good | good |

EXAMPLE 3

Waste Water Treatment

The waste water treatment adaptability of each of waste waters formed at the peeling treatments using the peeling liquids shown in Examples 1 and 2 was tested in the following manner.

Calcium hydroxide was added to the peeling liquid which had been used for the peeling treatment, so that the calcium hydroxide concentration was 1%. The liquid was then agitated and allowed to stand still to thereby form flocks. Then, the liquid was filtered through two piled gauze sheets.

The TOC values (total organic carbon values) were examined before addition of calcium hydroxide (before the treatment) and after addition of calcium hydroxide and filtration (after the treatment) by using a TOC measuring device manufactured by Toshiba-Beckmann, and the TOC removal ratios were calculated to obtain results shown in Table 6.

Table 6

| Fruit Treated | Sample No. | Peeling Liquid | TOC Value (ppm) before treatment | TOC Value (ppm) after treatment | TOC Removal Ratio (%) |
|---|---|---|---|---|---|
| orange | 1 | water containing 0.2% of sodium hydroxide, 0.1% of sucrose monooleate (HLB of 13) and 0.05% of sorbitan monolaurate | 8210 | 903 | 89 |
| orange | 2 | water containing 0.2% of sodium hydroxide, 0.1% of polyoxyethylene (15) soribtan palmitate and 0.02% of glycerin monooleate | 8100 | 1060 | 87 |
| orange | 7 | 0.8% hydrochloric acid → 0.5% sodium hydroxide | 5240 | 2820 | 46 |
| orange | 8 | 0.2% aqueous solution of sodium hydroxide | 12020 | 4720 | 60 |
| peach | 12 | water containing 0.5% of sodium hydroxide, 0.1% of sucrose monooleate (HLB of 13) and 0.1% of sorbitan monolaurate | 1370 | 384 | 72 |
| peach | 14 | 5% aqueous solution of sodium hydroxide | 1410 | 790 | 44 |

EXAMPLE 4

Peeling of Apple

Apple (Kokko variety) was cut into 4 pieces, and the cut pieces were immersed in a peeling liquid maintained at a prescribed temperature for a prescribed period of time. Then, the treated apple pieces were immersed in a 0.05N aqueous solution of citric acid for 30 seconds and washed with water. The peeling ratio was examined to obtain results shown in Table 7. The peeling ratio was expressed in terms of the ratio of the number of completely peeled apple pieces to the total number of apple pieces tested.

Table 7

| Peeling Liquid | Degree of Ripeness | Treatment Time(min.) | Treatment Temperature(° C) | Browning Rate | Flavor | Peeling Ratio(%) |
|---|---|---|---|---|---|---|
| Samples of the Present Invention | | | | | | |
| water containing 1.0% of sodium hydroxide, 0.1% of sucrose monooleate (HLB of 13) and 0.2% of sorbitan monolaurate | fully ripe | 3 | 80 | slightly low | good | 97 |
| water containing 1.0% of sodium hydroxide, 0.1% of polyoxyethylene(15) sorbitan palmitate and 0.2% of propylene glycol stearate | unripe | 4 | 85 | slightly low | good | 96 |
| Comparative Samples | | | | | | |
| 3% aqueous solution of sodium hydroxide | fully ripe | 4 | 80 | high | ordinary | 79 |
| 3% aqueous solution of sodium hydroxide | unripe | 5 | 85 | high | ordinary | 75 |

EXAMPLE 5

Peeling of Fig

Fig was immersed in a peeling liquid maintained at 85° C. for a prescribed period of time, washed with water, immersed in a 0.1% aqueous solution of citric acid for 30 seconds and washed with water. The peeling ratio (the ratio of the number of completely peeled fig fruits to the total number of fig fruits tested) was examined to obtain results shown in Table 8.

Table 8

| Peeling Liquid | Treatment Time (min.) | Color | Peeling Ratio (%) |
|---|---|---|---|
| water contaning 1% of sodium hydroxide, 0.1% of sucrose monopalmitate (HLB of 13) and 0.1% of sorbitan monolaurate (sample of the present invention) | 5 | natural color | 96 |
| 3.5% aqueous solution of sodium hydroxide (comparative sample) | 7 | slightly brown | 41 |

EXAMPLE 6

Peeling of Pear

Pear was cut into 2 pieces, and the cut pieces were immersed in a peeling liquid maintained at a prescribed temperature for a prescribed period of time then immersed in a 0.1% aqueous solution of citric acid for 30 seconds and washed with water. The peeling ratio (the ratio of the number of completely peeled fruit pieces to the total number of fruit pieces tested) was examined to obtain results shown in Table 9.

Table 9

| Peeling Liquid | Treatment Time (min.) | Treatment Temperature (° C) | Flavor | Peeling Ratio (%) |
|---|---|---|---|---|
| water containing 0.9% of sodium hydroxide, 0.1% of sucrose monolaurate (HLB of 15) and 0.1% of sorbitan monooleate (sample of the present invention) | 6 | 85 | excellent | 95 |
| 2.5% aqueous solution of sodium hydroxide (comparaive sample) | 7 | 90 | good | 73 |

EXAMPLE 7

Peeling of Plum

Plum was immersed in a peeling liquid maintained at 75° C. for a prescribed period of time and then washed with water. The peeling ratio (the ratio of the number of completely peeled plum fruits to the total number of plum fruits tested) was examined to obtain results shown in Table 10.

Table 10

| Peeling Liquid | Treatment Time (min.) | Flavor | Peeling Ratio (%) |
|---|---|---|---|
| water containing 1% of sodium hydroxide, 0.2% of sucrose oleate (HLB of 9) and 0.1% of sorbitan oleate (sample of the present invention) | 3 | good | 96 |
| 3% aqueous solution of sodium hydroxide (comparative sample) | 5 | ordinary | 64 |

What is claimed is:

1. A method for peeling fruits or vegetables, which consists essentially of the step of: immersing the fruit or vegetable in an aqueous alkaline solution having a temperature in the range of from room temperature to 90° C., for a time period of from 1 to 30 minutes, said aqueous alkaline solution consisting essentially of
   I. from 0.1 to 1.5 weight percent of alkali,
   II. from 0.005 to 1.0 weight percent of a mixture of
      (a) polyoxyethylene (3-60) sorbitan fatty acid ($C_8$-$C_{18}$) ester having an HLB value higher than 9, and
      (b) glycerine fatty acid ($C_8$-$C_{18}$) ester having an HLB value not higher than 9, said mixture containing from one to 5 parts by weight of component (a) and from one to 5 parts by weight of component (b) and
   III. The balance being essentially water.

2. A method as claimed in claim 1 in which said alkali is sodium hydroxide and the amount thereof is from 0.2 to 1.0 weight percent.

3. A method as claimed in claim 1 in which said alkali as sodium hydroxide and the amunt of thereof is from 0.2 to 0.5 weight percent.

4. A method for peeling fruits or vegetables, which consists essentially of the step of: immersing the fruit or vegetable in an aqueous alkaline solution having a temperature in the range of from room temperature to 90° C., for a time period of from one to 30 minutes, said aqueous alkaline solution consisting essentially of I. from 0.1 to 1.5 weight percent of alkali,
II. from 0.005 to 1.0 weight percent of a mixture of
  (a) polyoxyethylene (3–60) sorbitan fatty acid ($C_8$–$C_{18}$) ester having an HLB value higher than 9, and
  (b) sorbitan fatty acid ($C_8$–$C_{18}$) ester having an HLB value not higher than 9, said mixture containing from one to 5 parts by weight of component (a) and from one to 5 parts by weight of component (b) and
III. the balance being essentially water.

5. A method as claimed in claim 4, in which said alkali is sodium hydroxide and the amount thereof is from 0.2 to 1.0 weight percent.

6. A method as claimed in claim 4 in which said alkali is sodium hydroxide and the amount thereof is from 0.2 to 0.5 weight percent.

7. A method for peeling fruits or vegetables, which consists essentially of the step of: immersing the fruit or vegetable in an aqueous alkaline solution having a temperature in the range of from room temperature to 90° C., for a time period of from one to 30 minutes, said aqueous alkaline solution consisting essentially of
  I. from 0.1 to 1.5 weight percent of alkali,
  II. from 0.005 to 1.0 weight percent of a mixture of
    (a) polyoxyethylene (3–60) sorbitan fatty acid ($C_8$–$C_{18}$) ester having an HLB value higher than 9, and
    (b) propylene glycol fatty acid ($C_8$–$C_{18}$) ester having an HLB value not higher than 9, said mixture containing from one to 5 parts by weight of component (a) and from one to 5 parts by weight of component (b) and
  III. the balance being essentially water.

8. A method as claimed in claim 7 in which said alkali is sodium hydroxide and the amount thereof is from 0.2 to 1.0 weight percent.

9. A method as claimed in claim 7 in which said alkali is sodium hydroxide and the amount thereof is from 0.2 to 0.5 weight percent.

* * * * *